March 7, 1961 H. R. SCHMIDT ET AL 2,974,229
SHEET FILM PACK FOR X-RAY PHOTOGRAPHIC PURPOSES
Filed Aug. 26, 1958 2 Sheets-Sheet 1
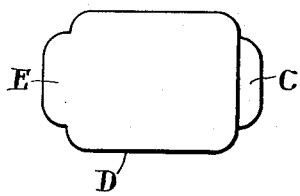
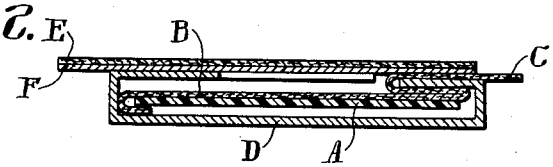
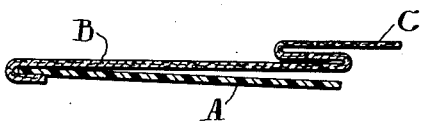
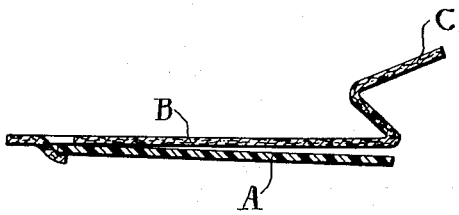
INVENTORS
Hans Robert Schmidt
Max Wiesner
BY
Connolly and Hutz
ATTORNEYS March 7, 1961 H. R. SCHMIDT ET AL 2,974,229
SHEET FILM PACK FOR X-RAY PHOTOGRAPHIC PURPOSES
Filed Aug. 26, 1958 2 Sheets-Sheet 2

INVENTORS
Hans Robert Schmidt
Max Wiesner
BY Connolly and Hutz
ATTORNEYS

United States Patent Office 2,974,229
Patented Mar. 7, 1961

2,974,229

SHEET FILM PACK FOR X-RAY PHOTOGRAPHIC PURPOSES

Hans Robert Schmidt, Leverkusen, and Max Wiesner, Leverkusen-Bayerwerk, Germany, assignors to Agfa Aktiengesellschaft, Leverkusen, Germany, a corporation of Germany Filed Aug. 26, 1958, Ser. No. 757,395

Claims priority, application Germany Aug. 28, 1957

4 Claims. (Cl. 250—69)

Single sheet film packs for X-ray photographic purposes, especially dental film packs, generally consist of an outer covering of a more or less pliable sheet-like material, for example paper or synthetic resin or a combination of both, and an insert which consists for example of one or more film sheets and sheets of light-impervious paper, and also, especially with dental film packs, of an additional metal foil. The outside covering is usually sealed by sticking by means of a moisture-insensitive adhesive, for example rubber solution, and may if desired made more or less insensitive to moisture by a lacquer coating. Single-sheet film packs have also been proposed in which the outer cover consists of rubber. The prior known sheet film packs have the disadvantage that they are difficult to open. As regards packs which are welded into plastic sheaths, opening is possible only with the aid of scissors. With other packs, tearing strips are provided, the film enclosed in a folded paper wrapping being disposed under these strips after opening. Moreover, packs are known in which the cover label is applied with dry adhesive, so that on opening some of the adhesive may be transferred to the film, this causing defects in development.

It has now been found that these disadvantages can be avoided if the film sheet or sheets arranged in a light-tight wrapping are connected to a pulling strip which partially projects from the pack, so that by means thereof the film can be extracted from the closed pack. A pre-requisite for such a pack is that the film is made up without the usual folded black paper. Moreover, it is advantageous if the lead foil inserted for protection against radiation is disposed externally of the pack or if it is combined with the pulling strip.

Various embodiments of the pulling strip and the connection of the film therewith are possible. To avoid the danger of penetration of light at the point at which the pulling strip extends out of the pack, this strip may be folded over so that it forms a labyrinth together with the surrounding outside wrapping. The inner end of the pulling strip is preferably folded over to embrace the film. Furthermore, the inner end of the pulling strip can be provided with stamped-out portions which accommodate one end of the film sheet.

Furthermore, the film can be fixed by means of adhesive to the pulling strip, it being possible to use dry adhesives or wet adhesives.

Another possibility for extracting the film from the pack is to use a thin filament which is wrapped around the film sheet or is fixed in a hanging eyelet. The end of the filament can be disposed externally of the film pack or be fixed to a paper strip.

All conventional and more or less pliable sheet-like materials can be used for the production of the dental film pack for this purpose, for example paper or plastic or combinations of both in various forms, it being possible for the paper to be lacquered, lined or coated by extrusion. In addition, combinations or paper or plastic with metal foils, for example aluminium foils, have been used.

In order to improve the light-fastness, the pulling strip is preferably made of black paper or thin cardboard, but in order to give that end of the pulling strip which projects from the cardboard a more pleasing appearance, this end can be lacquered, lined or printed.

In order to simplify making up of the film pack, it is also proposed that the lead foil should be lined with the label in known manner and the lead foil provided with a dry adhesive or a hot adhesive. It is also possible to unite the lead foil with a thin plastic foil which can be heat-sealed. According to another embodiment of the invention the lead foil may be combined with the pulling strip.

As examples of the new sheet film pack, various embodiments of a dental film pack are shown by way of example in the drawing:

Fig. 1 shows the dental film pack in plan view, C being the outer end of the pulling strip, D the wrapping of the pack with the cover sheet E, provided with an extension, for holding the pack.

Fig. 2 shows the dental film pack in cross-section. The film A is enclosed by the wrapped inner end of the pulling strip B. The other end of the strip, after it has been folded double, extends from the wrapping D at C. The upper side of the pack is sealed by the lead foil F and the label E.

Fig. 2A shows the label E and the lead foil.

Fig. 2B shows the wrapping D.

Fig. 3 shows the pulling strip with the bent-over end which embraces the film A.

Fig. 4 shows another form of the pulling strip B, which carries at the inner end a stamped-out portion which accommodates the film A.

Figure 5A:
Fig. 5A shows one form of pulling strip C connected by adhesive to the film A.
Figure 5B:
Fig. 5B shows another form of pulling strip C connected by adhesive to film A.
Figure 6A:
Fig. 6A shows a filament which is used instead of the paper pulling strip and which is fixed to a hanging eyelet on the film.
Figure 6B:
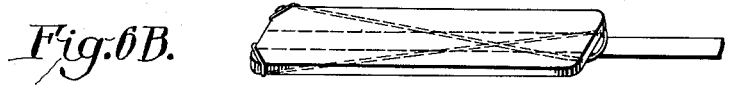
Fig. 6B shows a filament which serves as pulling strip and which is looped around the film sheet.
Figure 7:
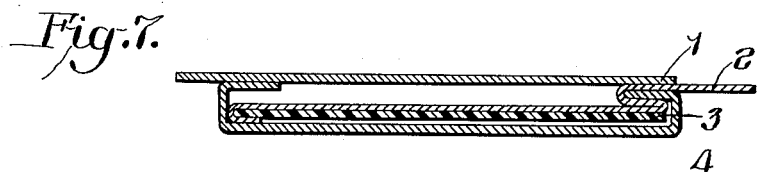
Fig. 7 shows another embodiment of a dental film pack in cross-section.
Figure 8:
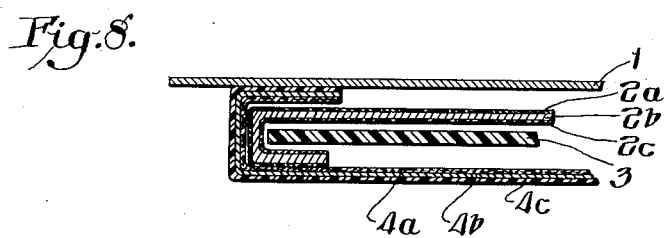

Fig. 8 an enlarged section of the pack according to Fig. 7.

In Fig. 7 and Fig. 8, 1 denotes the label, 2 the pulling strip which is composed of the paper foil *a*, the lead foil *b* and the foil of black paper *c*, 3 the film and 4 the outer wrapping which is composed of the black paper *a*, the aluminium foil or white paper *b* and the lacquer layer or the plastic layer *c*.

We claim:

1. A dental film pack comprising a light-tight wrapper, a film sheet disposed within said wrapper, said wrapper including an inwardly folded closure flap at one end thereof and a substantially longer inwardly folded body flap disposed in line with said closure flap and extending to within a short distance of its end to provide a space therebetween, a flat cover sheet fastened over said body flap and overlapping said closure flap to form a slot between it and said closure flap, a pull strip engaging an edge of said film sheet within said wrapper and extending outwardly through space and said slot, said pull strip interlocking with said closure flap and extending through said slot and space across the face of said film sheet adjacent said cover sheet and slightly around said edge of said film sheet which is disposed remote from said closure flap to seal said slot and space from entry of light and permit said film sheet to be readily withdrawn and subsequently readily disengaged from said pull strip, a film-protecting layer of lead foil attached to said cover sheet and disposed between said cover sheet and said wrapper over the full area of said wrapper, and said cover sheet extending a short distance beyond the end of said wrapper opposite to said pull strip to provide a grip tab.

2. A dental film pack according to claim 1, wherein said pull strip carries a film-protecting layer of lead foil.

3. A dental film pack according to claim 1, wherein the light-tight wrapper is a folded sheet comprising an aluminum foil.

4. A dental film pack according to claim 1, wherein said pull strip is formed with a stamped-out portion hooked over the film edge opposite the one from which the pull strip protrudes.

References Cited in the file of this patent

UNITED STATES PATENTS

| | | |
|---|---|---|
| 1,394,503 | Taylor | Oct. 18, 1921 |
| 1,687,068 | Hodgson | Oct. 9, 1928 |
| 2,049,497 | Gideon | Aug. 4, 1936 |
| 2,071,110 | Burke | Feb. 16, 1937 |
| 2,112,816 | Rulon | Mar. 29, 1938 |
| 2,127,365 | McHugh | Aug. 16, 1938 |